E. CHAMBERLIN.

Devices for Clamping Whip-Sockets to Vehicles.

No. 5,698. Reissued Dec. 23, 1873.

WITNESSES:
P. C. Dieterich
C. H. Watson

INVENTOR:
Edwin Chamberlin per: T. H. Alexander & Co
ATTORNEYS.

THE NORRIS PETERS CO., PHOTO-LITHO., WASHINGTON, D. C.

UNITED STATES PATENT OFFICE.

EDWIN CHAMBERLIN, OF LANSINGBURG, ASSIGNOR, BY MESNE ASSIGNMENTS, TO HIMSELF AND JOHN O. MERRIAM, OF TROY, NEW YORK.

IMPROVEMENT IN DEVICES FOR CLAMPING WHIP-SOCKETS TO VEHICLES.

Specification forming part of Letters Patent No. 43,896, dated August 23, 1864; reissue No. 2,387, dated November 6, 1866; reissue No. 4,787, dated March 5, 1872; reissue No. 5,698, dated December 23, 1873; application filed May 22, 1873.

DIVISION A.

*To all whom it may concern:*

Be it known that I, EDWIN CHAMBERLIN, of Lansingburg, in the county of Rensselaer and State of New York, have invented certain new and useful Improvements in Whip-Sockets; and it consists in providing a two-part fastening or clamp, embracing the socket and that part of the vehicle to which the same is attached and secured by suitable means, as hereinafter more fully described; and I do hereby declare that the following is a full, clear, and exact description thereof, which will enable others skilled in the art to which it appertains to make and use the same, reference being had to the accompanying drawing with letters of reference marked thereon forming a part of this specification, in which—

Figure 1:
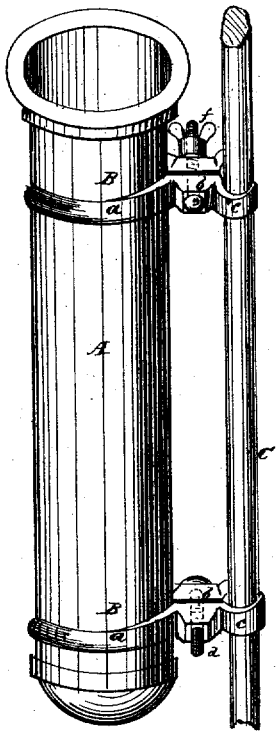
Figure 2:
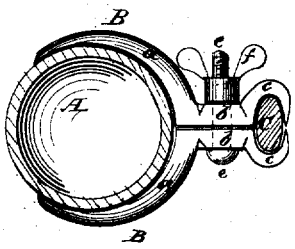

Figure 1 represents a side elevation of a device embodying my invention. Fig. 2 represents a section of the socket, showing a plan view of the fastener; and Fig. 3 represents a sectional view of the socket and a plan view of the fastener, showing a modification of the screw and nut in Fig. 1.

A represents a socket, which may be of any suitable or desired form. C represents the dash-rail or other part of the vehicle to which the socket may be attached. B B represent the fastening device formed in two parts. The parts *a a* embrace the socket; the parts *b b* form a means by which the parts are clamped together by the assistance of a screw, or bolt and nut, and the parts *c c* embrace the dash-rail. *e* represents a bolt, having a head upon one end and a screw-thread upon the other, and *f* represents a thumb-nut used in connection therewith to secure the parts together.

Figure 3:
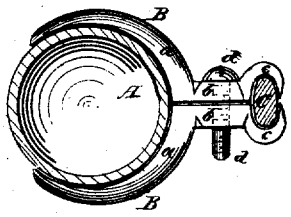

A modification of this bolt and nut is shown in Fig. 3, by the screw *d*, in which case the nut is dispensed with, and a screw-thread formed in the part *b*.

By this means a simple and efficient device is formed and made detachable, both from the socket and vehicle, and which will conform to hold any ordinary-sized socket in use; and by being constructed in two parts it is more convenient to be attached to the socket.

Having thus fully described my invention, what I claim, and desire to secure by Letters Patent, is—

A fastening device, formed in two parts, and constructed to embrace both the socket and the dash-rail, or other part of the vehicle, and secured by a bolt and nut or screw, as and for the purpose set forth.

EDWIN CHAMBERLIN.

Witnesses:
C. D. KELLUM,
J. W. ALGER.